(12) United States Patent
Erden et al.

(10) Patent No.: US 9,373,349 B1
(45) Date of Patent: Jun. 21, 2016

(54) RELAXING MEDIA DESIGN CONSTRAINTS WITH TWO-DIMENSIONAL MAGNETIC RECORDING

(71) Applicant: SEAGATE TECHNOLOGY LLC, Cupertino, CA (US)

(72) Inventors: Mehmet Fatih Erden, St. Louis Park, MN (US); Edward Charles Gage, Lakeville, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/724,993

(22) Filed: May 29, 2015

(51) Int. Cl.
*G11B 5/82* (2006.01)
*G11B 5/74* (2006.01)
*G11B 20/10* (2006.01)

(52) U.S. Cl.
CPC .......... *G11B 5/746* (2013.01); *G11B 20/10268* (2013.01)

(58) Field of Classification Search
None
See application file for complete search history.

(56) References Cited

U.S. PATENT DOCUMENTS

| | | | | | |
|---|---|---|---|---|---|
| 4,161,753 | A * | 7/1979 | Bailey | ..................... | G11B 7/013 360/18 |
| 4,819,092 | A * | 4/1989 | Richards | ............ | G11B 5/00878 360/27 |
| 5,079,219 | A * | 1/1992 | Barnes | ..................... | G11B 5/00 360/131 |
| 5,587,223 | A * | 12/1996 | White | ..................... | G11B 5/64 283/82 |
| 5,745,315 | A * | 4/1998 | Aoyama | .................. | G11B 5/09 360/51 |
| 5,805,024 | A * | 9/1998 | Takashi | ............ | G11B 20/10009 327/159 |
| 6,304,405 | B1 * | 10/2001 | Asano | .................... | G11B 19/20 360/53 |
| 6,600,613 | B1 * | 7/2003 | Nakamura | ............. | G06K 7/084 340/146.2 |
| 7,041,394 | B2 | 5/2006 | Weller et al. | | |
| 7,097,924 | B2 * | 8/2006 | Haginoya | .............. | G11B 5/667 360/135 |
| 7,126,891 | B1 * | 10/2006 | Kobayashi | .......... | G11B 7/0053 369/124.04 |
| 7,376,062 | B2 * | 5/2008 | Hsu | ....................... | H04L 9/0836 369/53.24 |
| 7,667,912 | B2 | 2/2010 | Goldberg et al. | | |
| 7,916,415 | B1 * | 3/2011 | Chue | .................. | G11B 5/59688 360/48 |
| 8,035,910 | B2 | 10/2011 | Mallary et al. | | |
| 8,301,948 | B2 | 10/2012 | Blaum et al. | | |
| 8,582,226 | B2 | 11/2013 | Tetzlaff et al. | | |

(Continued)

*Primary Examiner* — Peter Vincent Agustin
(74) *Attorney, Agent, or Firm* — Taylor English Duma LLP

(57) ABSTRACT

Technologies are described herein for relaxing design constraints on magnetic recording media through the use of two-dimensional magnetic recording in a storage device. A storage device comprises a magnetic recording surface comprising a plurality of discrete storage locations formatted in an ordered pattern, the magnetic recording surface configured so that a single bit of data is stored in two or more of the discrete storage locations. The storage device further includes a read-write channel configured to utilize two-dimensional magnetic recording to read and write data to the magnetic recording surface.

20 Claims, 5 Drawing Sheets

(56) References Cited

U.S. PATENT DOCUMENTS

| | | | |
|---|---|---|---|
| 8,693,121 B1* | 4/2014 | McNeill | G11B 20/10009 360/39 |
| 8,861,122 B1* | 10/2014 | Hwang | G11B 5/59616 360/55 |
| 9,019,650 B1* | 4/2015 | Shan | G11B 5/48 360/75 |
| 9,105,302 B1* | 8/2015 | Erden | G11B 20/10268 |
| 2001/0038583 A1* | 11/2001 | Miyagawa | G11B 7/0045 369/47.17 |
| 2002/0054443 A1* | 5/2002 | Seng | G11B 20/10009 360/32 |
| 2002/0145826 A1* | 10/2002 | Zangari | B82Y 25/00 360/135 |
| 2003/0048709 A1* | 3/2003 | Van Woudenberg | G11B 7/00736 369/47.28 |
| 2008/0094742 A1* | 4/2008 | Albrecht | B82Y 10/00 360/48 |
| 2008/0204915 A1* | 8/2008 | Albrecht | B82Y 10/00 360/48 |
| 2009/0059430 A1* | 3/2009 | Dobisz | B82Y 10/00 360/137 |
| 2010/0020443 A1* | 1/2010 | Albrecht | B82Y 10/00 360/135 |
| 2010/0172048 A1* | 7/2010 | Albrecht | B82Y 10/00 360/40 |
| 2010/0296379 A1* | 11/2010 | Ito | G11B 5/743 369/53.41 |
| 2011/0075288 A1* | 3/2011 | Krichevsky | B82Y 10/00 360/31 |
| 2011/0235484 A1* | 9/2011 | Horigome | G11B 7/0065 369/44.33 |
| 2013/0182349 A1* | 7/2013 | Tagami | G11B 20/10222 360/51 |
| 2014/0254043 A1* | 9/2014 | Liao | H04L 7/0331 360/48 |
| 2014/0281793 A1 | 9/2014 | Patapoutian | |
| 2015/0179193 A1* | 6/2015 | Batra | G11B 5/3954 360/125.02 |

* cited by examiner

RELAXING MEDIA DESIGN CONSTRAINTS WITH TWO-DIMENSIONAL MAGNETIC RECORDING

BRIEF SUMMARY

The present disclosure relates to technologies for relaxing design constraints on magnetic recording media, such as that in a hard-disk drive ("HDD") device, through the use of two-dimensional magnetic recording. According to some embodiments, a storage device comprises a magnetic recording surface comprising a plurality of discrete storage locations formatted in an ordered pattern, the magnetic recording surface configured so that a single bit of data is stored in two or more of the discrete storage locations. The storage device further includes a read-write channel configured to utilize two-dimensional magnetic recording to read and write data to the magnetic recording surface.

According to further embodiments, a method for reading data from a recording surface comprises receiving a read signal from each of a plurality of reader elements, the read signals representing bits stored in discrete storage locations on the recording surface, wherein each bit is stored in at least two discrete storage locations. Two-dimensional recording techniques are then used to decode user data from the detected bits.

According to further embodiments, a system includes a magnetic recording surface comprising a plurality of discrete storage locations formatted in an ordered pattern, the magnetic recording surface configured so that a single bit of data is stored in two or more of the discrete storage locations. The system also includes a plurality of reader elements configured to read the discrete storage locations and a read-write channel configured to utilize two-dimensional magnetic recording to read and write data to the magnetic recording surface.

These and other features and aspects of the various embodiments will become apparent upon reading the following Detailed Description and reviewing the accompanying drawings.

BRIEF DESCRIPTION OF THE DRAWINGS

In the following Detailed Description, references are made to the accompanying drawings that form a part hereof, and that show, by way of illustration, specific embodiments or examples. The drawings herein are not drawn to scale. Like numerals represent like elements throughout the several figures.

DETAILED DESCRIPTION

Figure 1:
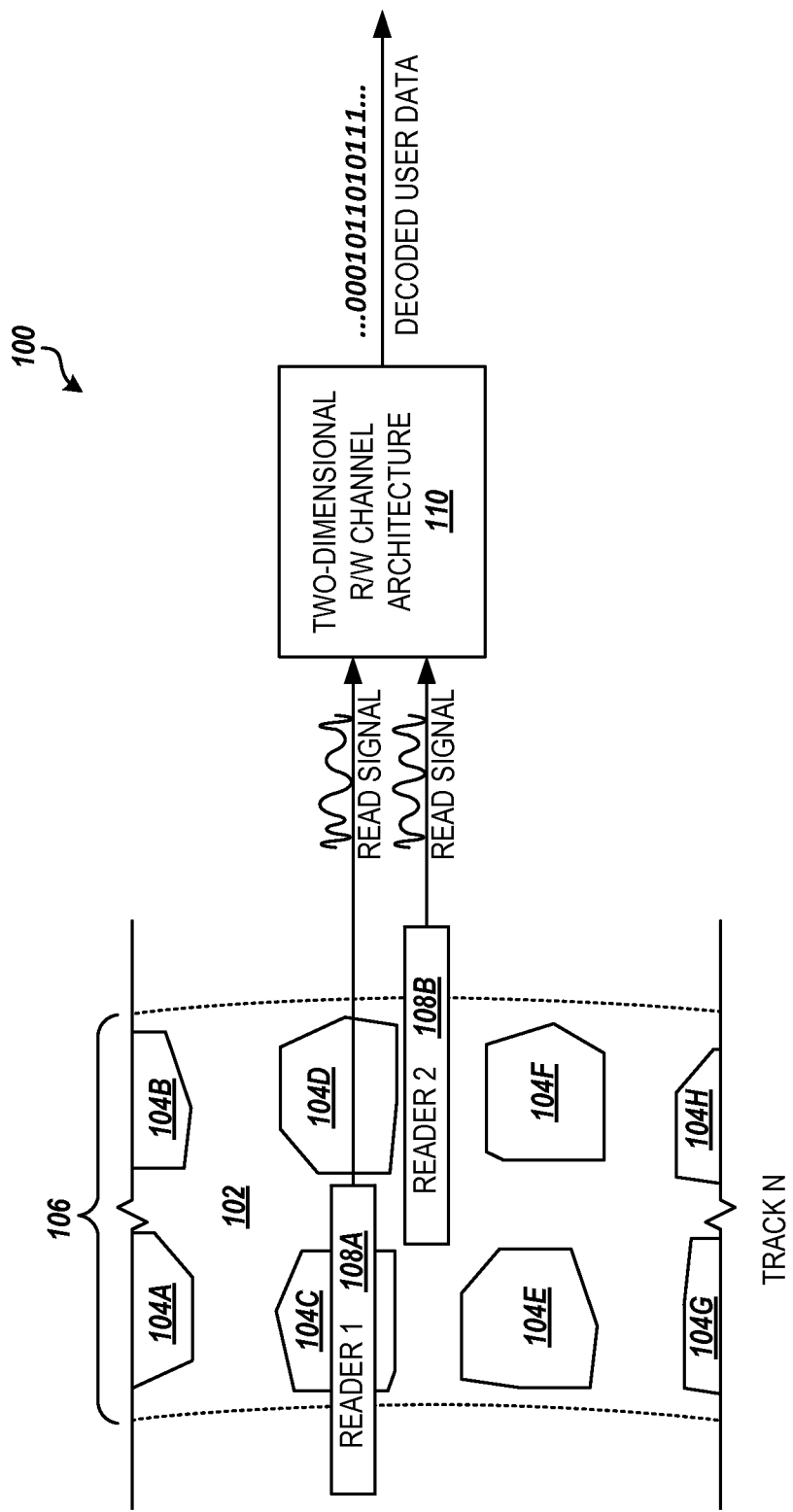
FIG. 1 is a block diagram showing a system that utilizes TDMR and ordering of islands/grains in an HDD device to relax the design constraints of magnetic recording media, according to embodiments described herein.

The following detailed description is directed to technologies for relaxing design constraints on magnetic recording media through the use of two-dimensional magnetic recording ("TDMR") and/or multi-sensor magnetic recording ("MSMR"). A typical storage device having magnetic recording media may include a hard-disk drive ("HDD") device. The HDD device may contain a number of storage disks with magnetic recording surfaces for the storage of data. The magnetic recording surfaces may comprise granular media where the surface is coated with a continuous coating of random grains of paramagnetic material. In conventional granular media, no ordering of the grains (e.g., in position, shape, and size) is assumed. Instead, some number of grains are utilized together for the storage of each bit of data. In typical HDD devices, around 10 grains-per-bit may be utilized to achieve acceptable signal-to-noise ratio ("SNR") levels in the read signal in order to manufacture an HDD.

Alternatively, the recording surfaces may comprise bit-patterned media ("BPM") consisting of "islands" of paramagnetic material of consistent shape and size uniformly positioned on the disk substrate with non-magnetic material in between. Conventionally, one bit of data may be stored on each island, with very tight variations in the ordering of the islands necessary to maintain adequate SNR. For example, variations on island size, shape, and position in a typical HDD may be limited to a standard deviation of one sigma of approximately 5% of the island pitch.

With both of these types of recording media, it is becoming more difficult to maintain historical areal density capacity ("ADC") growth rates to satisfy ever-increasing drive capacities. For granular media, it is very difficult to continue to scale down the size of the grains while keeping them thermally stable and still have around 10 grains-per-bit. In the case of BPM, controlling the tight variations on island size and position at sub-nanometer levels with acceptable costs is also difficult. For example, in designing magnetic recording media for an HDD storing 2 terabits-per-square-inch ("Tbpsi"), granular media would require a density of 20 tera-grains-per-square-inch in order to assign around 10 grains-per-bit, yielding an approximately 5.5 nm grain pitch. For BPM, 2 tera-islands-per-square-inch media would be required yielding an approximately 17 nm island pitch. At 5% variation on island size (0.85 nm), the tooling required for manufacturing the BPM media would be very expensive.

Utilizing the embodiments provided herein, two-dimensional magnetic recording ("TDMR") may be combined with some short and long-range ordering of the magnetic islands/grains on the recording surfaces to leverage the inherently two-dimensional nature of the magnetic recording surface and relax the media constraints described above while maintaining ADC and reliability of the device. TDMR uses the read signal from multiple, adjacent locations on the recording surface in conjunction with two-dimensional channel architecture to read data from the recording surface while mitigating the effects of interference in cross-track and down-track directions. This allows tighter spacing of tracks and symbols (bits) on the media. In addition, the channel architecture may be designed so that each symbol or bit of data may be stored in more than one island or ordered group of grains on the recording surface. In this way, the grain density and/or tight ordering requirements of conventional granular and/or BPM media design may be relaxed without losing ADC or reliability of the storage device.

FIG. 1 provides an overview of an illustrative system 100 that utilizes TDMR and ordering of islands/grains in an HDD device to relax the design constraints of magnetic recording media. The system 100 includes a recording media consisting of at least one magnetic recording surface 102 comprising ordered islands of paramagnetic material for the storage of data, such as islands 104A-104H (referred to herein generally as islands 104). The islands 104A-104H may represent single grains of magnetic material or groupings of grains. According to some embodiments, the islands 104 are arranged in concentric data tacks, such as data track 106, on the recording surface 102.

The system 100 further includes one or more reader elements, such as reader elements 108A-108B (referred to herein generally as reader elements 108). The reader elements 108 may represent magneto-resistive ("MR") readers on a read/write head associated with the recording surface 102, for example. In some embodiments, the system 100 may utilize two reader elements 108A and 108B to read magnetic signals encoded in the islands 104 on track N 106 substantially simultaneously. The reader elements 108 may be narrower than the track width and offset from one another, as shown in FIG. 1. Alternatively, the reader elements may be as wide as or wider than the track 106 and aligned along a center line. In further embodiments, the system 100 may include any combination of wide or narrow reader elements 108 in a variety of alignments. In other embodiments, the system 100 may include a single reader element 108 that makes multiple passes over the track 106 in order to read the associated signals.

The signals from the reader element(s) 108 are decoded by a two-dimensional r/w channel architecture 110 to recover the data stored in the data track 106. According to embodiments, the two-dimensional r/w channel architecture 110 is configured such that each bit of data is stored in two or more islands 104 on the recording surface 102. For example, islands 104C and 104D in track N 106 may be utilized to store a single bit based on the two-dimensional codes utilized by the magnetic recording channel. By storing a single bit of data in two or more islands 104 on the recording surface 102, the constraints on the design of the recording media may be relaxed without losing ADC or reliability of the HDD, as will described in more detail below in regard to FIGS. 3-5.

Figure 2:
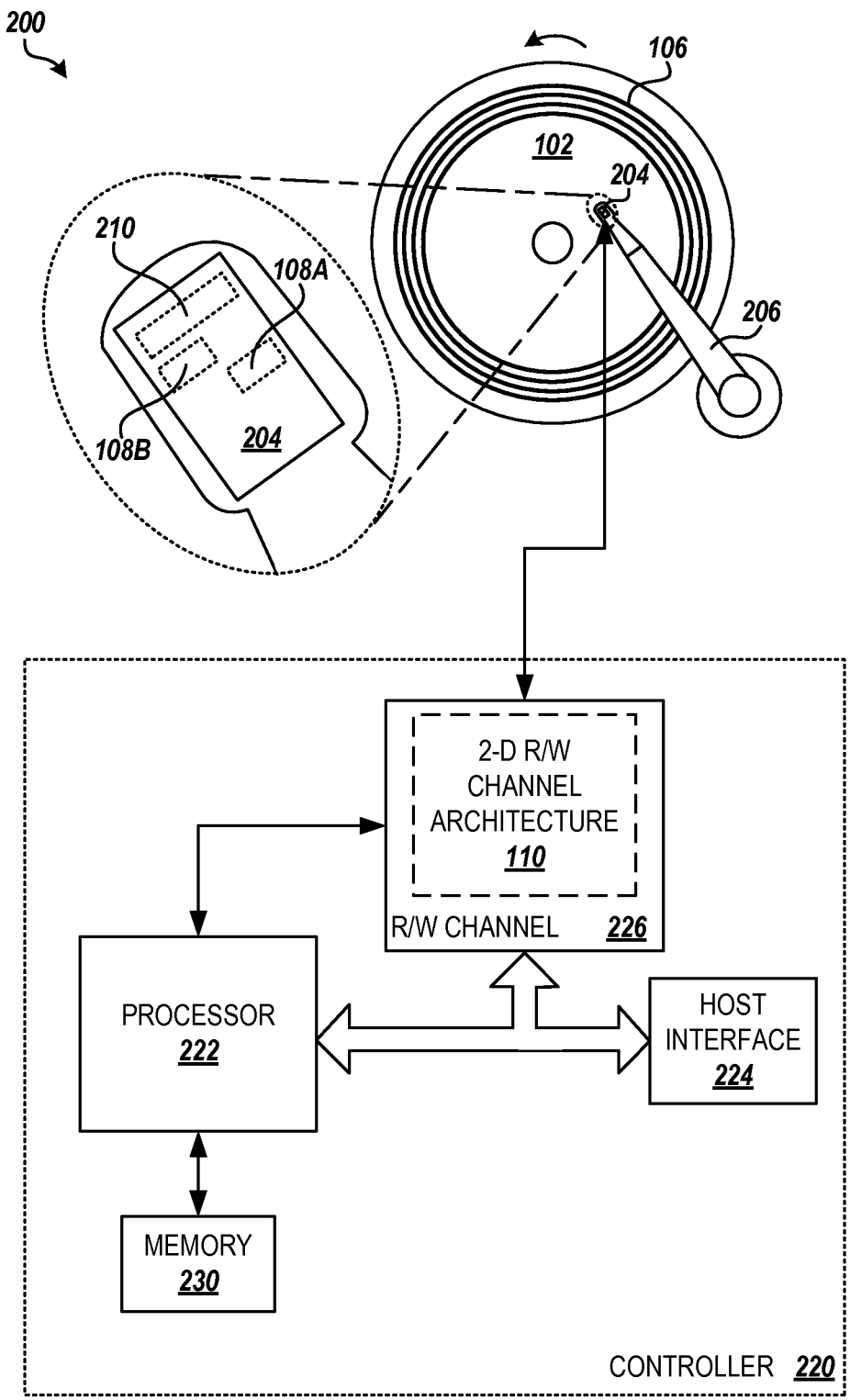
FIG. 2 is a block diagram showing an illustrative environment for relaxing design constraints on magnetic recording media through the use of two-dimensional magnetic recording in a storage device, according to embodiments described herein.

FIG. 2 and the following description are intended to provide a general description of a suitable environment in which the embodiments described herein may be implemented. In particular, FIG. 2 shows an illustrative storage device 200, such as an HDD apparatus, along with hardware, software, and components for relaxing design constraints on magnetic recording media through the use of two-dimensional magnetic recording, according to the embodiments provided herein. The storage device 200 may include recording media comprising at least one platter or disk. The disk(s) may include magnetic recording surfaces 102 divided or "formatted" into a number of individual data tracks, such as data track 106. The data tracks 106 may represent substantially concentric circular areas on the recording surface 102 of the disk.

The storage device 200 further includes at least one read/write head 204 located adjacent to the recording surface 102 of each disk. The read/write head 204 may read information from the disk 202 by sensing a magnetic field formed on portions of the surface of the disk, and may write information to the disk by magnetizing a portion of the surface of the disk. The read/write head 204 may be located at the distal end of an arm 206 that rotates in order to reposition the read/write head 204. The read/write head 204 includes one or more reader elements, such as reader elements 108A and 108B. The reader elements 108 may comprise magneto-resistive ("MR") readers, tunneling MR readers, or the like. It will be appreciated that the size, location, and relative orientation of the reader elements 108 shown in FIG. 2 are for illustrative purposes only, and one of ordinary skill in the art will recognize that other sizes, locations, and relative orientations are possible and part of this disclosure. The read/write head 204 further includes at least one writer element 210. The read/write head 204 may further include other components not shown in the figure or described herein, such as head heaters; temperature sensors; writer shields; HAMR elements such as a near field transducer, optical elements, or a laser diode; and the like.

The storage device 200 may further comprise a controller 220 that controls the operations of the storage device. The controller 220 may include a processor 222. The processor 222 may implement an interface 224 allowing the storage device 200 to communicate with a host device, other parts of storage device 200, or other components, such as a server computer, personal computer ("PC"), laptop, tablet, game console, set-top box or any other electronics device that can be communicatively coupled to the storage device 200 to store and retrieve data from the storage device. The processor 222 may process write commands from the host device by formatting the associated data and transfer the formatted data via a read/write channel 226 through the writer elements 210 of the read/write head 204 and to the recording surface 102. The processor 222 may further process read commands from the host device by determining the location of the desired data on the recording surface 102, moving the read/write head(s) 204 over the determined location, reading the data from the surface of the disk via the read/write channel 226, correcting any errors and formatting the data for transfer to the host device.

The read/write channel 226 may convert data between the digital signals processed by the processor 222 and the analog signals conducted through the reader elements 108 and writer elements 210 of the read/write head 204 for reading and writing data to the recording surface 102 of the disk. The analog signals to and from the read/write head 204 may be further processed through a pre-amplifier circuit. The read/write channel 226 may further provide servo data read from the recording surface 102 to an actuator to position the read/write head 204. The reader elements 108 and writer elements 210 may be positioned to read or write data to a specific location on the recording surface 102 by moving the read/write head 204 radially across the data tracks 106 using the actuator while a motor rotates the disk to bring the target location under the read/write head.

According to embodiments, the read/write channel 226 of the storage device 200 implements the two-dimensional r/w channel architecture 110 described above. The two dimensional read channel architecture 110 may include any combination of two-dimensional equalizers, two-dimensional detectors, two-dimensional encoder/decoders, or the like. The two-dimensional r/w channel architecture 110 may comprise hardware circuits in the read/write channel 226, processor-executable instructions for execution in the processor 222 or any combination of these and other components in the controller 220. As discussed herein, two-dimensional codes utilized by the two-dimensional r/w channel architecture 110 may be configured such that each bit of the user data is written to and read from two more islands 104 or groupings of grains on the recording surface 102, according to some embodiments.

The controller 220 may further include a computer-readable storage medium or "memory" 230 for storing processor-executable instructions, data structures, and other information. The memory 230 may comprise a non-volatile memory, such as read-only memory ("ROM") and/or FLASH memory, and a random-access memory ("RAM"), such as dynamic random access memory ("DRAM") or synchronous dynamic random access memory ("SDRAM"). For example, the non-volatile memory and/or the RAM may store a firmware that comprises commands and data necessary for performing the operations of the storage device 200. According to some embodiments, the memory 230 may store processor-executable instructions that, when executed by the processor, perform the routine 600 for utilizing multiple reader elements 108 to read data from a magnetic recording surface 102 using two-dimensional magnetic recording, as described herein.

In addition to the memory 230, the environment may include other computer-readable media storing program modules, data structures, and other data described herein for relaxing design constraints on magnetic recording media through the use of two-dimensional magnetic recording of the storage device 200. It will be appreciated by those skilled in the art that computer-readable media can be any available media that may be accessed by the controller 220 or other computing system for the non-transitory storage of information. Computer-readable media includes volatile and non-volatile, removable and non-removable recording media implemented in any method or technology, including, but not limited to, RAM, ROM, erasable programmable ROM ("EPROM"), electrically-erasable programmable ROM ("EEPROM"), FLASH memory or other solid-state memory technology, compact disc ROM ("CD-ROM"), digital versatile disk ("DVD"), high definition DVD ("HD-DVD"), BLU-RAY or other optical storage, magnetic cassettes, magnetic tape, magnetic disk storage or other magnetic storage devices and the like.

It will be appreciated that the structure and/or functionality of the storage device 200 may be different than that illustrated in FIG. 2 and described herein. For example, the processor 222, read/write channel 226, memory 230 and other components and circuitry of the storage device 200 may be integrated within a common integrated circuit package or distributed among multiple integrated circuit packages. Similarly, the illustrated connection pathways are provided for purposes of illustration and not of limitation, and some components and/or interconnections may be omitted for purposes of clarity. It will be further appreciated that the storage device 200 may not include all of the components shown in FIG. 2, may include other components that are not explicitly shown in FIG. 2 or may utilize an architecture completely different than that shown in FIG. 2.

Figure 3:
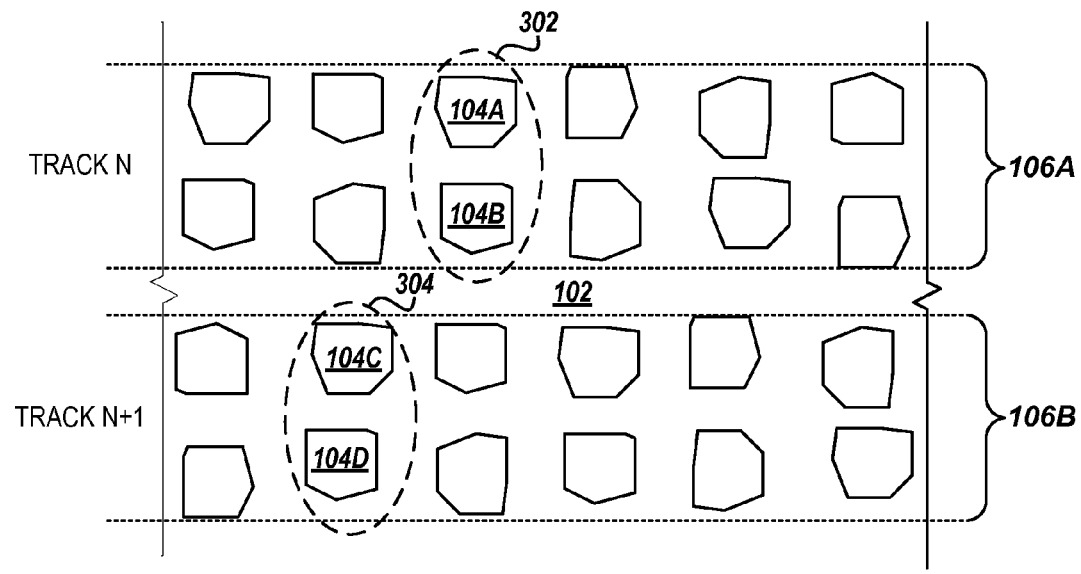
FIGS. 3-5 are block diagrams showing exemplary media designs for a storage device in which the constraints on the magnetic recording media may be relaxed through the use of two-dimensional magnetic recording, according to embodiments described herein.
Figure 4:
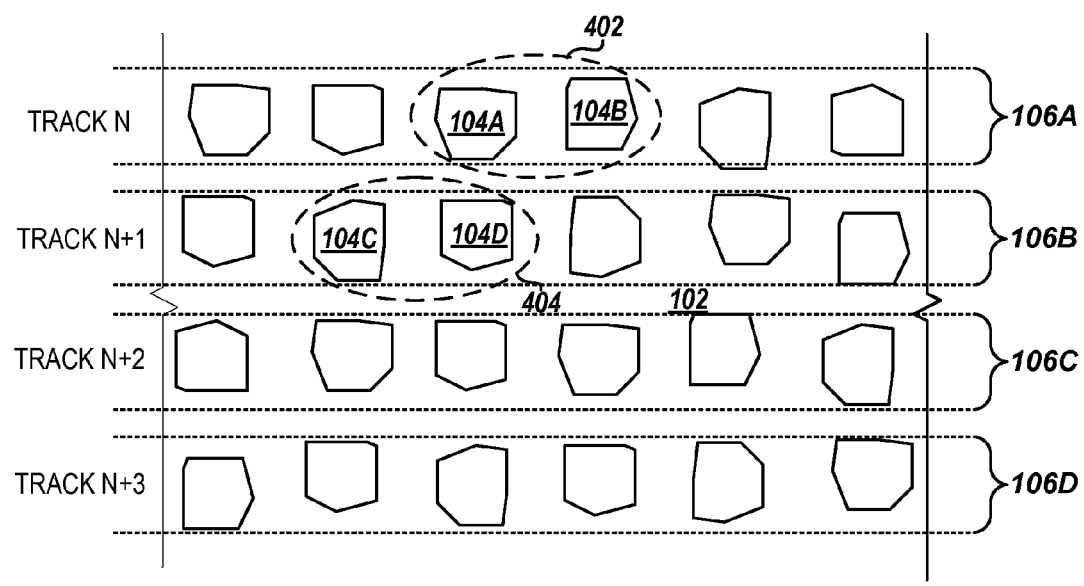
Figure 5:
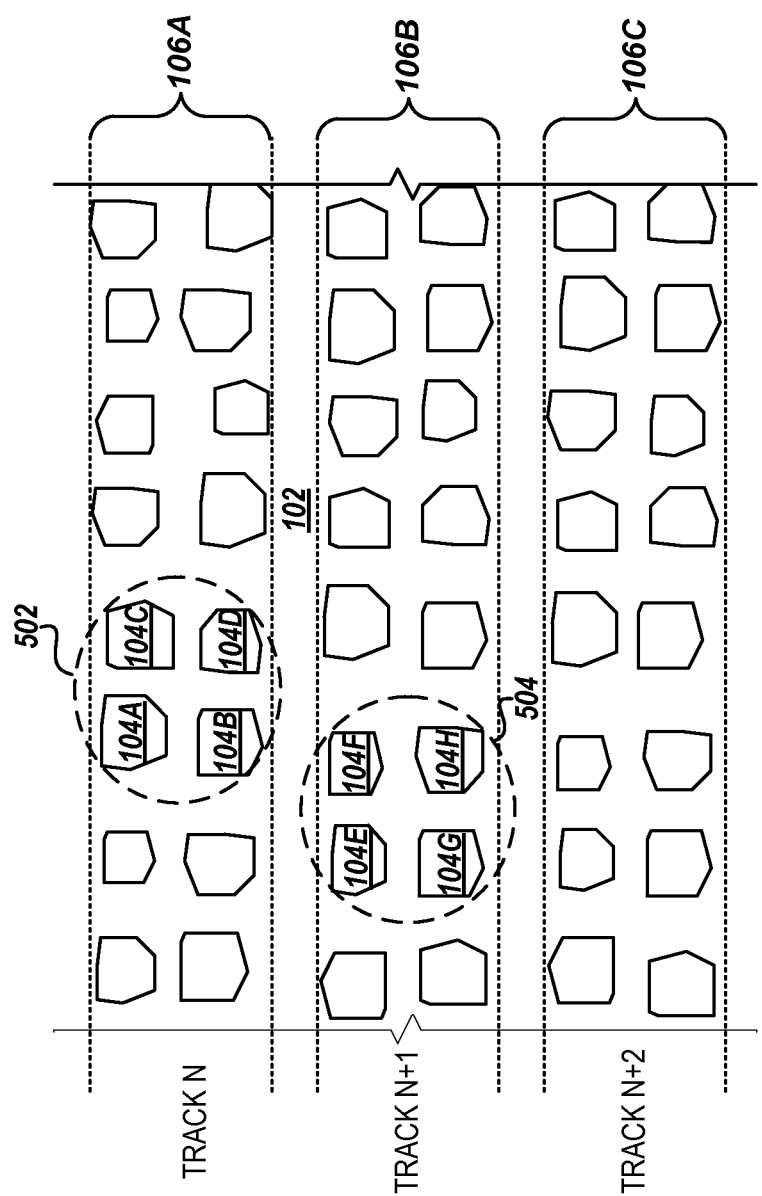

FIGS. 3-5 provide exemplary media designs for a storage device 200 in which the constraints on the magnetic recording media may be relaxed through the use of two-dimensional magnetic recording. As discussed above, a conventional HDD with a target 2 Tbpsi ADC would require 20 tera-grains-per-square-inch media (approximately 5.5 nm grain pitch) in a continuous granular media implementation or 2 tera-islands-per-square-inch media (approximately 17 nm island pitch) with less than 5% variation in the ordering for a BPM implementation. It is noted that simply applying TDMR to conventional BPM media may result in some relaxing of the tight variations on island size and position from the read process perspective.

In some embodiments, however, the two-dimensional r/w channel architecture 110 may be configured such that each bit of data is stored in two islands 104 on the recording surface 102, as shown in FIGS. 3 and 4. For example, a single bit may be written to two adjacent islands in the cross-track direction, such as islands 104A and 104B in track N 106A, as shown at 302, or islands 104C and 104D in track N+1 106B as shown at 304 in FIG. 3. Similarly, a single bit may be written to two adjacent islands in the down-track direction, such as islands 104A and 104B in track N 106A, as shown at 402, or islands 104C and 104D in track N+1 106B as shown at 404 in FIG. 4.

Utilizing this storage device 200, a 2 Tbpsi storage device may be implemented with BPM that would require 4 tera-islands-per-square-inch media (much less than 20 tera-grains-per-square-inch in granular media). In addition, the variation allowed in the ordering in the cross-track or down-track direction increases from 5%, resulting in a relaxation in the constraints of the media design when compared with conventional BPM. Because each bit is stored in two islands 104, the larger variations in short-range and long-range ordering can be compensated for in the two-dimensional r/w channel architecture 110 and/or error-correcting codes ("ECC") so that loss of a single island is not catastrophic to data retrieval. Further, in the example shown in FIG. 4, the down-track writing clock can be off by more than 5% when compared with conventional BPM.

According to further embodiments, the two-dimensional r/w channel architecture 110 may be configured such that each bit of data is stored in four islands 104 on the recording surface 102, as shown in FIG. 5. For example, a single bit may be written to adjacent islands in both the cross-track and down-track directions, such as islands 104A-104D in track N 106A, as shown at 502, or islands 104E-104H in track N+1 106B, as shown at 504. Utilizing this storage device 200, a 2 Tbpsi storage device may be implemented with ordered grains that would require 8 tera-islands-per-square-inch media, but with larger variation allowed in the ordering in the cross-track and down-track directions, resulting in a further relaxation of media constraints. In addition, as described above, the down-track writing clock can be off by more than 5% when compared with conventional BPM.

Similar relaxation in media constraints may be realized by applying such two-dimensional r/w channel architectures to continuous granular media, according to further embodiments. Utilizing TDMR may allow the 2 Tbpsi ADC storage device to be implemented in less grain dense media with larger grains (thus improved SNR) as long as some ordering in grain location and size is applied to the grains within each grouping, and each bit of data is stored in multiple grains, thus approaching the example shown in FIG. 5. For example, utilizing these two-dimensional r/w channel architectures, the media may be designed with 5 grains per grouping instead of 10, allowing a less grain dense media design with larger grains. The larger grains may provide adequate SNR as well as be more thermally stable.

It will be appreciated that using TDMR technology to relax media design constraints results in an interpolation between two extremes: one requiring small grains with no ordering and the other requiring very tight constraints on ordering with larger island sizes. The media designs presented in FIGS. 3-5 are presented as examples, and the optimum point between these two extremes can be chosen for a given application. In addition, the proposed media designs presented can be combined with custom system optimization steps to get more capacity out of the storage device, such as designing the recording system to use a re-read feature to determine phase (location of media dots or grains), and short range and long range media correlation functions, implementing channel features that take phase and media correlation functions as input (both write and read), and the like.

Figure 6:
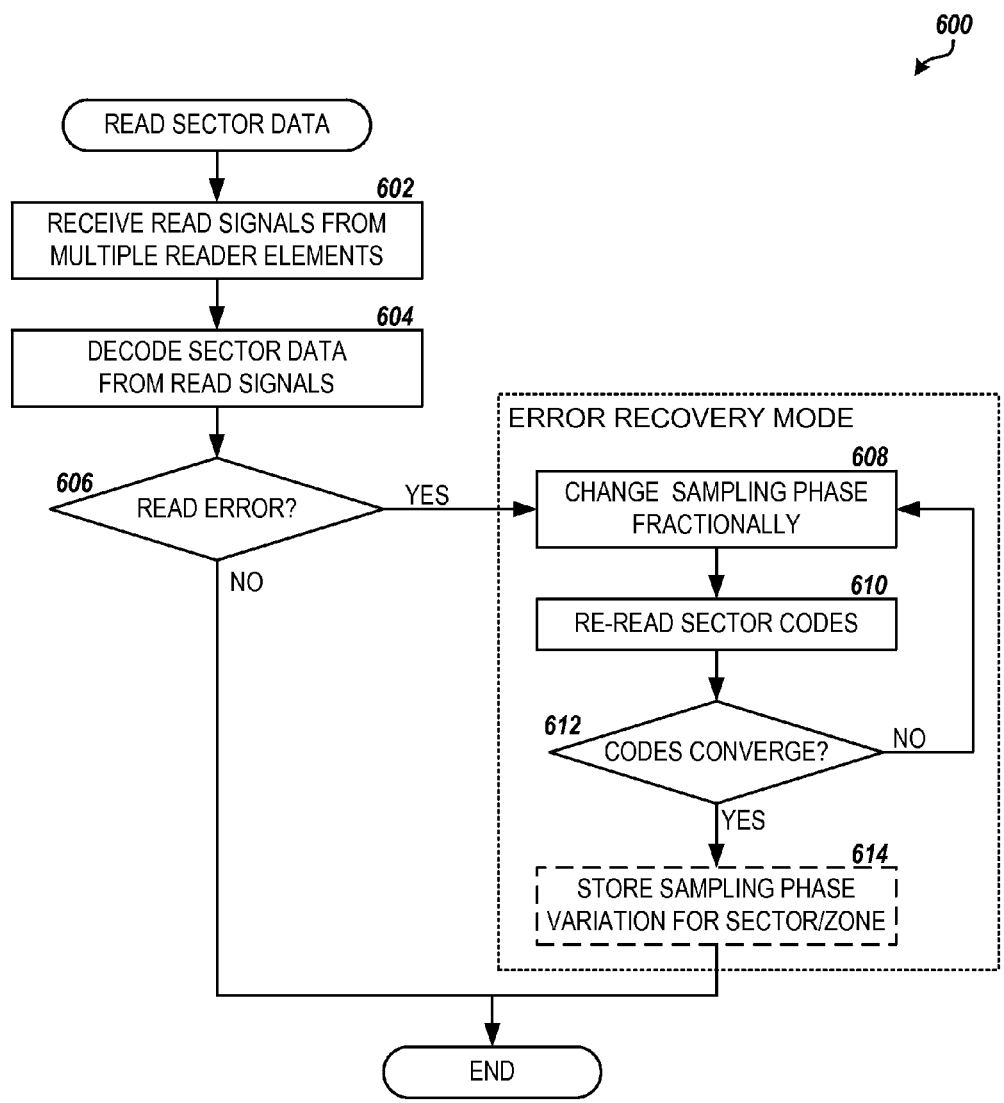
FIG. 6 is a flow diagram showing one routine for utilizing multiple reader elements to read data from a magnetic recording surface using two-dimensional magnetic recording, according to embodiments described herein.

For example, during error recovery ("ER") mode for a read error, the two-dimensional r/w channel architecture 110 may apply re-reads at different sampling phases until the sector data converges. In addition, upon a successful read, the sampling phase information identified during ER mode may be saved to be used during on-the-fly ("OTF") reading within the timing recovery and equalization blocks for subsequent reads from the target location (e.g., sector or zone). FIG. 6 illustrates one routine 600 for utilizing two-dimensional magnetic recording to read data from a magnetic recording surface 102 having relaxed design constraints, according to some embodiments. The routine 600 may be performed by storage devices 200 implementing the media design described above in regards to FIGS. 3-5. According to embodiments, the routine 600 may be performed by the two-dimensional r/w channel architecture 110 of the storage device 200 during a read of data from the magnetic recording surface 102. In further embodiments, the routine 600 may be performed by the controller 220 of the storage device 200, by external processors or computing systems performing storage processing in the storage device, or some other combination of modules, processors, and devices.

The routine 600 begins at step 602, where the two-dimensional r/w channel architecture 110 receives read signals from multiple reader elements 108. For example, the two-dimensional r/w channel architecture 110 may receive the read signals from the reader elements 108A and 108B depicted in FIG. 1. From step 602, the routine 600 proceeds to step 604, where the two-dimensional r/w channel architecture 110 decodes the sector data from the read signals.

According to embodiments, each symbol or bit represented in the read signals is stored in more than one discrete storage location on the recording surface 102. For example, each symbol or bit may be stored in two adjacent islands 104 in the cross-track direction, as shown in FIGS. 1 and 3, and read substantially simultaneously by the two reader elements 108A and 108B. The two-dimensional r/w channel architecture 110 may include two dimensional equalizers and/or detectors that utilize a design-based sampling phase to detect the bit based on the signal read from the two discrete storage locations. The detected bits may then be sent to conventional channel decoder(s) to decode the user data.

From step 604, the routine 600 proceeds to step 606, where it is determined whether a read error has occurred. For example, if the codes read from the target sector do not converge, then the controller may enter the ER mode as described above. Upon detecting the read error, the routine 600 proceeds to step 608, where the two-dimensional r/w channel architecture 110 may make fractional changes to the sampling phase while performing re-reads of the sector data until the codes converge, as shown at steps 610 and 612. In this way, the two-dimensional r/w channel architecture 110 can account for variations in the long-range ordering of the islands 104 or grains on the magnetic recording surface 102 that exceed those allowed in conventional BPM.

In some embodiments, once the data has been successfully read in the ER mode, the routine 600 may proceed to step 614, where the sampling phase variation that allowed the convergence of the codes may be stored associated with the target location of the read. For example the sampling phase variation may be stored in the memory 230 or other storage location in the storage device 200 associated with the target sector or the zone containing the target sector. The stored sampling phase variation may then be utilized by the two-dimensional r/w channel architecture 110 on subsequent reads from the sector or zone without having to utilize the ER mode to recover the data. In additional embodiments, a similar method as described above may be utilized during write operations to find an optimum writing phase using a rewrite-then-read method, with the optimum writing phase stored associated with the target sector, track, or zone of the write. In this way, subsequent write operations to the sector, track, or zone may utilize the stored optimum writing phase. From step 614, the routine 600 ends.

Based on the foregoing, it will be appreciated that technologies for relaxing design constraints on magnetic recording media through the use of two-dimensional magnetic recording are presented herein. It will be appreciated that while embodiments are described herein in regard to an HDD device, it will also be appreciated that the embodiments described in this disclosure may be utilized to read data in any storage device containing data stored in substantially parallel or substantially concentric tracks on a magnetic recording media, including but not limited to, a magnetic disk drive, a hybrid magnetic and solid state drive, a magnetic tape drive and the like. The above-described embodiments are merely possible examples of implementations, merely set forth for a clear understanding of the principles of the present disclosure.

The logical operations, functions, or steps described herein as part of a method, process or routine may be implemented (1) as a sequence of processor-implemented acts, software modules, or portions of code running on a controller or computing system and/or (2) as interconnected machine logic circuits or circuit modules within the controller or computing system. The implementation is a matter of choice dependent on the performance and other requirements of the system. Alternate implementations are included in which operations, functions or steps may not be included or executed at all, may be executed out of order from that shown or discussed, including substantially concurrently or in reverse order, depending on the functionality involved, as would be understood by those reasonably skilled in the art of the present disclosure.

It will be further appreciated that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

Many variations and modifications may be made to the above-described embodiments without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

What is claimed is:

1. A storage device comprising:
   a magnetic recording surface comprising a plurality of discrete storage locations formatted in an ordered pattern, the magnetic recording surface configured so that a single bit of data is stored in two or more of the discrete storage locations; and a read/write channel configured to utilize two-dimensional magnetic recording to read and write data to the magnetic recording surface.

2. The storage device of claim 1, further comprising two or more reader elements for reading signals from the discrete storage locations.

3. The storage device of claim 1, further comprising a single reader element making multiple passes over the discrete storage locations to read multiple signals from the discrete storage locations.

4. The storage device of claim 1, wherein the discrete storage locations comprise islands in bit-patterned media and each bit of data is stored in two adjacent islands in a cross-track direction of the bit-patterned media.

5. The storage device of claim 1, wherein the discrete storage locations comprise islands in bit-patterned media and each bit of data is stored in two adjacent islands in a down-track direction of the bit-patterned media.

6. The storage device of claim 1, wherein the discrete storage locations comprise islands in bit-patterned media and each bit of data is stored in four islands of the bit-patterned media.

7. The storage device of claim 1, wherein storing a single bit of data in two or more of the discrete storage locations is effected through use of two-dimensional codes for encoding and decoding data in the read/write channel.

8. The storage device of claim 1, wherein the storage device comprises a hard disk drive apparatus.

9. The storage device of claim 1, wherein the read/write channel is further configured to, upon detecting a read error, perform re-reads of the discrete storage locations while varying a sampling phase until the data from the discrete storage locations is read successfully.

10. The storage device of claim 9, wherein the read/write channel is further configured to, upon the successful read of the data from the discrete storage locations, store the sampling phase variation in a memory of the storage device associated with the discrete storage locations, wherein the stored sampling phase variation is utilized by the read/write channel in subsequent reads of the discrete storage locations.

11. A method for reading data from a recording surface, the method comprising steps of:
receiving a read signal from each of a plurality of reader elements, the read signals representing bits of data stored in discrete islands of paramagnetic material on the recording surface, wherein each bit of data is stored in at least two discrete islands; and
utilizing two-dimensional recording to decode user data from the bits detected in the read signals.

12. The method of claim 11, wherein each bit of data is stored in two adjacent islands in a cross-track direction of bit-patterned media.

13. The method of claim 11, wherein each bit of data is stored in two adjacent islands in a down-track direction of bit-patterned media.

14. The method of claim 11, wherein each bit of data is stored in four islands of bit-patterned media.

15. The method of claim 11, further comprising steps of:
determining whether a read error occurred in the reading of the data; and
upon determining that the read error occurred, performing re-reads of the bits of data in the discrete islands while varying a sampling phase until the user data is decoded successfully.

16. The method of claim 11, wherein the recording surface is on a disk of a hard disk drive apparatus.

17. A system comprising:
a magnetic recording surface comprising a plurality of discrete islands of paramagnetic material formatted in an ordered pattern, the magnetic recording surface configured so that a single bit of data is stored in two or more of the discrete islands;
a plurality of reader elements configured to read the discrete islands; and
a read-write channel configured to utilize two-dimensional magnetic recording to read and write data to the magnetic recording surface.

18. The system of claim 17, wherein each bit of data is stored in two adjacent islands in a cross-track direction of bit-patterned media.

19. The system of claim 17, wherein each bit of data is stored in two adjacent islands in a down-track direction of bit-patterned media.

20. The system of claim 17, wherein each bit of data is stored in four islands of bit-patterned media.

* * * * *